(12) United States Patent
Lehman et al.

(10) Patent No.: US 6,748,768 B2  
(45) Date of Patent: Jun. 15, 2004

(54) APPARATUS AND METHOD OF DOPING SILICA WITH FLUORINE DURING LAYDOWN

(75) Inventors: Michael J. Lehman, Canisteo, NY (US); Vaidyanathan Srikant, Evanston, IL (US); Jeffery S. Stone, Addison, NY (US)

(73) Assignee: Corning Incorporated, Corning, NY (US)

( * ) Notice: Subject to any disclaimer, the term of this patent is extended or adjusted under 35 U.S.C. 154(b) by 15 days.

(21) Appl. No.: 10/033,144

(22) Filed: Oct. 26, 2001

(65) Prior Publication Data

US 2002/0073734 A1 Jun. 20, 2002

Related U.S. Application Data

(60) Provisional application No. 60/255,760, filed on Dec. 15, 2000.

(51) Int. Cl.[7] ............................................. C03B 37/018
(52) U.S. Cl. ........................... 65/413; 65/414; 65/421; 65/530; 65/415
(58) Field of Search ........................... 65/414, 531, 413, 65/421, 530, 415

(56) References Cited

U.S. PATENT DOCUMENTS

| 4,221,825 A | 9/1980 | Guerder et al. ............... 427/34 |
| 4,402,720 A | 9/1983 | Edahiro et al. .............. 65/3.12 |
| 4,627,866 A | 12/1986 | Kanamori et al. ............ 65/3.12 |
| 4,629,485 A | 12/1986 | Berkey ......................... 65/3.11 |
| 4,737,179 A | 4/1988 | Tanaka et al. ................ 65/3.12 |
| 5,194,714 A | 3/1993 | Le Sergent ............. 219/121.36 |
| 5,599,371 A | 2/1997 | Cain et al. ...................... 65/413 |
| 5,895,515 A | 4/1999 | Ishikawa et al. .............. 65/377 |
| 5,958,809 A | 9/1999 | Fujiwara et al. .............. 501/54 |
| 6,291,377 B1 | 9/2001 | Komine et al. ............... 501/54 |

FOREIGN PATENT DOCUMENTS

| JP | 6-122527 | * 5/1994 | .................. 65/414 |
| WO | WO 01/83388 A2 | 11/1910 | ......... C03B/37/014 |

OTHER PUBLICATIONS

Abstract of JP406122527, May 1994.*

* cited by examiner

Primary Examiner—James Derrington
(74) Attorney, Agent, or Firm—Randall S. Wayland

(57) ABSTRACT

A method for doping silica soot with fluorine during laydown, including providing a bait rod, and providing a burner, wherein the burner emits a reactant flame. The method also including providing at least one first gas-feed separate from the burner, wherein the gas-feed supplies a first jet of fluorine-based gases, and depositing a layer of silica soot on the bait rod by vaporizing a silica producing gas within the reactant flame of the burner. The method further including supplying the first jet of fluorine-based gases to the silica soot deposited on to the bait rod via the first gas-feed subsequent to vaporizing at least a portion of the silica producing gas within the reactant flame of the burner.

13 Claims, 3 Drawing Sheets

APPARATUS AND METHOD OF DOPING SILICA WITH FLUORINE DURING LAYDOWN

This application claims priority to and the benefit of U.S. Provisional Patent Application No. 60/255,760, filed Dec. 15, 2000.

BACKGROUND OF THE INVENTION

1. Field of the Invention

The present invention relates to a method for creating an optical fiber, and more specifically, a method for doping silica soot with fluorine during laydown.

2. Technical Background

In the production of optical waveguide fibers, conventional chemical vapor deposition methods such as vapor axial deposition (VAD) and outside vapor deposition (OVD) use source compounds such as chlorides of silicon ($SiCl_4$) and germanium ($GeCl_4$). The source compounds are converted into vapor form using either bubblers or evaporators. The vapor is then transported into a flame and reacted with oxygen to form oxide soot particles. These soot particles may be doped with various elements and compounds to alter the relative refractive index of the resultant core or cladding segment as discussed below. These particles are collected on a rotating starting rod or bait tube in the case of VAD or rotating mandrel in the case of OVD. In some OVD systems, the cladding portion of the preform is deposited on a previously formed core preform or core cane, rather than on a mandrel.

Various elements and compounds may be added to the silica soot particles that alter the relative refractive index thereof. One such element, fluorine, is used as a "down-dopant" or a dopant that decreases the refractive index of the corresponding core or cladding segment. While the use of fluorine as a dopant is advantageous in particular fiber profiles, the utilization of fluorine has numerous disadvantages and drawbacks associated with the doping process, or the process of adding the fluorine to the silica soot.

Historically, the doping of fluorine into silica soot particles has been achieved by passing a fluorine containing gas through the fume line and/or through the inner shield of an associated burner system. Typically, the flow of a silica producing gas flowing through the burner is regulated so as to attain a ratio of fluorine containing gases in the fume line to the silica producing gas of approximately 1 to 1. This ratio normally results in a fluorine incorporation in the silica soot of about 1.0 wt %. This level can be further increased to between approximately 1.7 wt % to 1.8 wt % with the addition of about 1 to 2 slpm of fluorine containing gas in the inner shield of the burner. In either case, the resultant deposition rate is relatively low, between 0.15 to 0.2 g/minute, with a large percent of the fluorine ending up as either hydrofluoric acid (HF), or as un-reacted initial fluorine gas exiting with the out-going fluent gases.

In the past, the fluorine containing gases that were selected as the doping gas were chosen from those gases that would not react easily with silica, such as $CF_4$ and $C_2F_6$. This allowed the silica soot particles to form prior to reaction with the fluorine, and resulted in an overall increased doping effectiveness.

The inefficient reaction of the fluorine dopant coupled with the significant loss of fluorine in the outgoing fluent gases, as well as the potential release of harmful HF into the atmosphere are some of the problems typically associated with using fluorine as a silica dopant. A solution is needed therefore which allows for a more efficient method for doping silica soot with fluorine while simultaneously reducing waste of the fluorine dopant as well as the pollution associated with harmful fluoride gases.

SUMMARY OF THE INVENTION

One aspect of the present invention is to provide a method for doping silica soot with fluorine during laydown, including providing a bait rod, and providing a burner, wherein the burner emits a reactant flame. The method also includes providing at least one first gas-feed separate from the burner, wherein the gas-feed supplies a first jet of fluorine-based gases, and depositing a layer of silica soot on the bait rod by vaporizing a silica producing gas within the reactant flame of the burner. The method further includes supplying the first jet of fluorine-based gases to the silica soot deposited onto the bait rod via the first gas-feed subsequent to vaporizing at least a portion of the silica producing gas within the reactant flame of the burner.

Another aspect of the invention is to provide an apparatus for doping silica soot with fluorine during the formation of an optical fiber, that includes a burner adapted to emit a reactant flame to vaporize a silica producing gas, and at least one first gas-feed separate from the burner, wherein the gas-feed is adapted to supply a first jet of fluorine-based gases. The reactant flame emitted from the burner is used to vaporize the silica producing gas thereby creating a silica soot which is deposited on a bait rod. The first gas-feed is oriented such that the first jet of fluorine-based gases contacts the silica soot subsequent to at least a portion of the silica producing gas being vaporized within the reactant flame of the burner.

Additional features and advantages of the invention will be set forth in the detailed description which follows and will be apparent to those skilled in the art from the description or recognized by practicing the invention as described in the invention which follows, together with the claims and the appended drawings.

It is to be understood that the foregoing description is exemplary of the invention only and is intended to provide an overview for the understanding of the nature and character of the invention as it is defined in the claims. The accompanying drawings are included to provide a further understanding of the invention and are incorporated and constitute part of the specification. The drawings illustrate various features and embodiments of the invention which, together with their description, serve to explain the principles and operation of the invention.

DETAILED DESCRIPTION OF THE PREFERRED EMBODIMENTS

For purposes of the description herein, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions, and other physical characteristics relating to the embodiments disclosed herein are not to be considered as limiting unless the claims expressly state otherwise.

Figure 1:
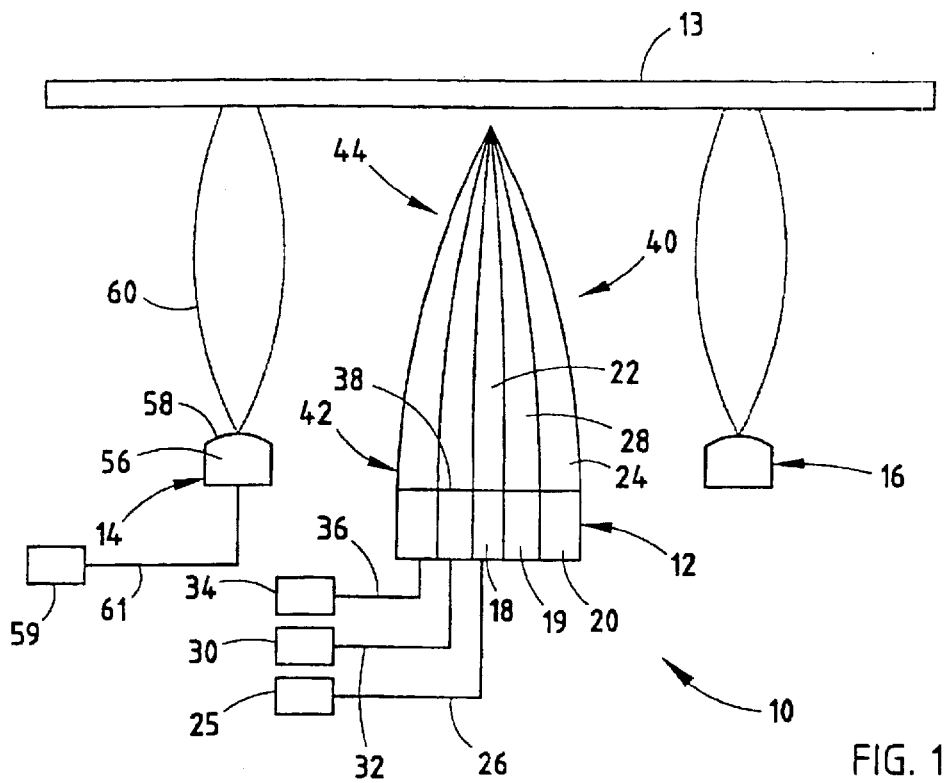
FIG. 1 is a schematic view of a burner/gas-feed system of the present invention, wherein the gas-feeds are oriented to form a linear manifold.

Referring initially to FIG. 1, there is shown a burner/gas-feed system 10 that includes a burner 12 that vaporizes a silica-based gas to create a silica soot for depositing onto a bait rod 13. A first gas-feed 14 and a second gas-feed 16 each supply a fluorine containing gas for doping the silica soot. Burner 12 is provided a gas-emitting first region 18, a gas-emitting second region 19 which surrounds the first region 18, and a gas-emitting third region 20 that surrounds the second region 19. The first region 18 emits a glass-forming mixture 22 of a silica producing gas from a source 25 which is in fluid communication with first region 18 via a supply line 26. The second region 19 emits an inert gas 28 such as nitrogen, helium or argon from a source 30 which is in fluid communication with second region 19 via a supply line 32. The third region 20 emits a combination of oxygen and a combustible gas to form a reactant flame 24 from a source 34 that is in fluid communication with third region 20 via a supply line 36. Beyond a nozzle end 38 of burner 12 is a conversion area 40 having a proximal area 42 and distal area 44 that is located away from burner 12. Proximal area 42 of conversion area 40 is in communication with first region 18, second region 19, and third region 20 of burner 12.

Figure 2:
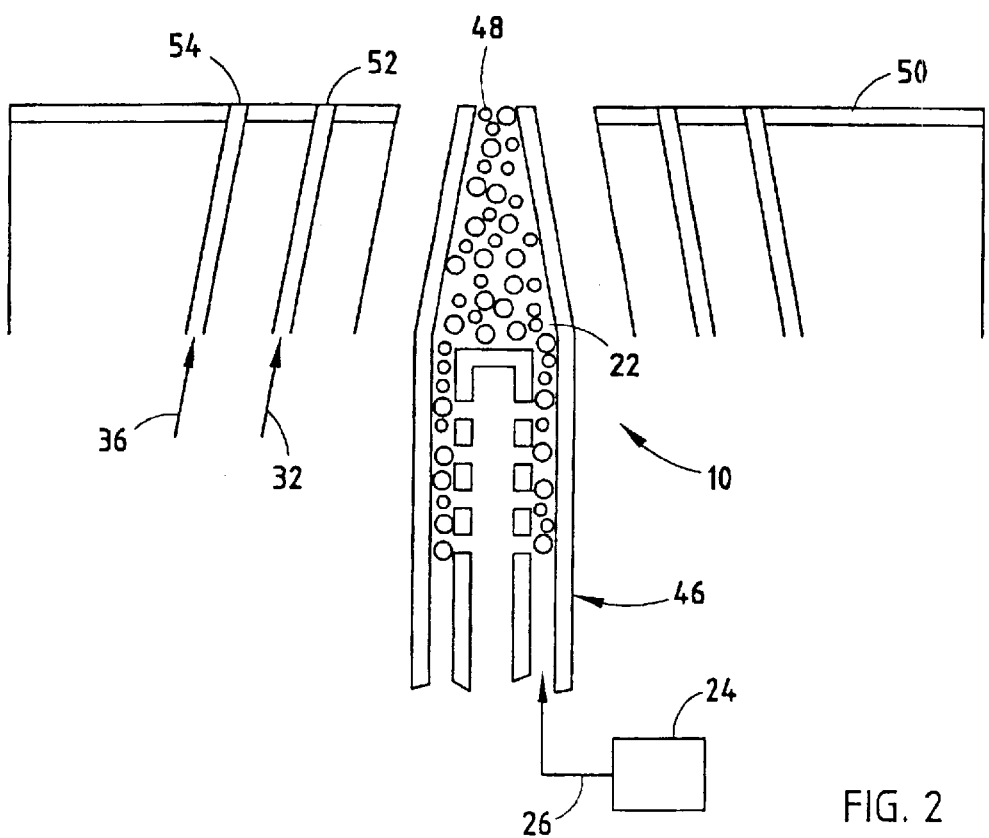
FIG. 2 is a schematic view of a burner.

As seen in FIG. 2, burner 12 is a precision atomizing burner similar to that disclosed in U.S. Pat. No. 5,599,371, the relevant parts of which are incorporated herein by reference. First region 18 of burner 12 is an atomizer 46 that delivers glass-forming mixture 22 to a centrally-located aperture 48 in a face plate 50 of burner 12 and into proximal area 42 of conversion area 40. The glass forming mixture 22 (FIG. 1) is originally delivered to atomizer 46 in the form of a liquid from source 25. It should be noted, that atomizer 42 is used only as an example of a possible atomizer that could be used, and that any aerosol forming device could be substituted, including pressurized atomizers, two-fluid external atomizers, or any other atomizer.

Figure 3:
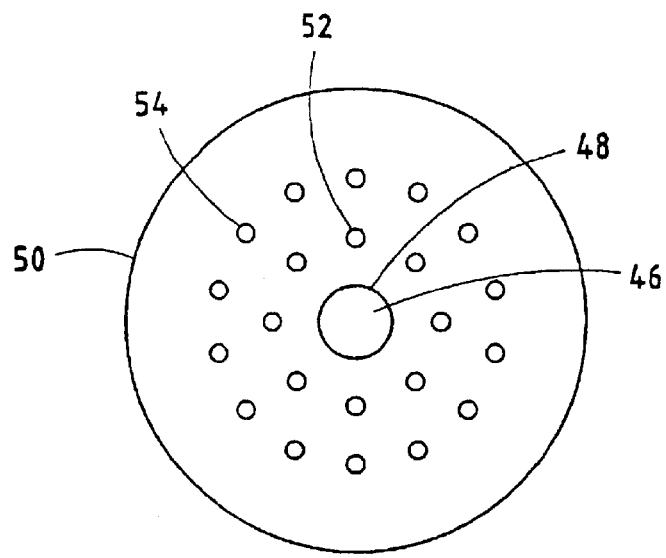
FIG. 3 is a schematic view of a face plate of the burner.

Face plate 50 (FIG. 3) of burner 12 includes one or more inner rings of concentric apertures 52 that are used to emit the shield of inert gas 28 (FIG. 1), such as nitrogen, helium, or argon from source 30. Face plate 50 also includes one or more outer rings of concentric apertures 54 that are used to emit a fuel/oxygen mixture. In the present example, a fuel/oxygen mixture of $CH_4O_2$ was combusted to form the methane-oxygen flame 24, however, any suitable fuel may be used.

The first gas-feed 14 (FIG. 1) and second gas-feed 16 of the burner/gas-feed system 10 are similar in construction and operation. Therefore, a description of first gas-feed 14 should be considered exemplary of both first gas-feed 14 and second gas-feed 16. The first gas-feed 14 includes a nozzle 56 having a nozzle end 58. The nozzle end 58 of nozzle 56 is adapted to emit a jet of fluorine-based gases 60 supplied from a source 59 via a supply line 61. The compounds chosen for the fluorine-based gases 60 include $SF_6$ and $CF_4$, with $SF_6$ being significantly more effective than $CF_4$. It should be noted that the $SF_6$ compound was selected because it is highly reactive, which is contrary to prior art teachings wherein the least reactive compounds are preferred. The highly reactive gases are utilized in the present invention due to the decreased temperature at which the fluorine gases contact the silica soot as compared with the prior art which teaches providing the fluorine gases to an associated burner via a fume line and/or through the inner shield where the temperature is much greater.

In operation, glass forming mixture 22 is provided to first region 18 of burner 10, wherein atomizer 46 atomizes the glass forming mixture 22 and nozzle end 38 of burner 12 supplies a jet of the atomized glass forming mixture 22 into conversion area 40. Third region 20 is supplied with a fuel oxygen mixture from source 34, wherein the fuel/oxygen mixture is ignited to form the reactant flame 24 within conversion area 40. Reactant flame 24 vaporizes the atomized glass forming mixture 22 within conversion area 40, thereby creating a silica-based glass soot that is deposited on bait rod 13. Nozzle 56 of first gas-feed 14 supplies the jet of fluorine-based gases 60 to the silica-based glass soot previously deposited on bait rod 13, thereby doping the silica based soot with fluorine. In this embodiment, nozzle 56 of first gas-feed 14 and second gas-feed 16 are oriented to form a linear manifold, or in other words, such that the jets of fluorine-based gases 60 contact the bait rod and the silica soot deposited thereon in a substantially orthogonal direction. The nozzles 56 of first gas-feed 14 and second gas-feed 16 are further positioned and oriented such that the jets of fluorine based gases 60 do not contact the silica soot prior to the silica soot being deposited onto bait rod 13.

Figure 4:
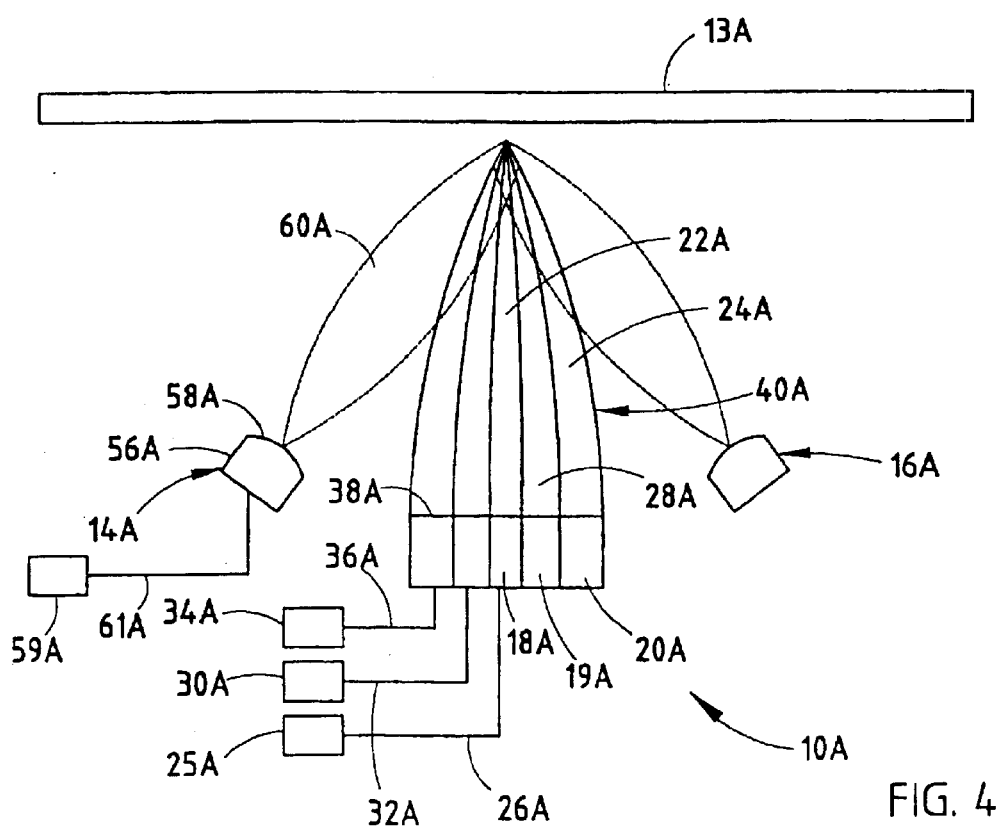
FIG. 4 is an alternative embodiment of the burner/gas-feed system, wherein the gas-feeds are oriented to form a focused manifold.

The reference 10A (FIG. 4) generally designates another embodiment of the burner/gas-feed system. Since burner/gas-feed system 10A is similar to the previously described burner/gas-feed system 10, similar parts appearing in FIGS. 1 and 4, respectively, are represented by the same, corresponding reference numerals, except for the suffix "A" in the numerals of the later. In the burner/gas-feed system 10A, the nozzles 56A of first gas-feed 14A and second gas-feed 16A are each oriented at an acute angle of about 45° to bait rod 13A to form a focused manifold, or such that the jets of the fluorine-based gases 60A contact the silica soot particles subsequent to the soot particles being formed but prior to the silica soot particles being deposited onto bait rod 13A. Directing the jets of fluorine-based gases 60 to contact the silica soot particles prior to the silica soot particles being deposited upon bait rod 13 allows the fluorine-based gases to react with the silica soot particles at an increased temperature as compared to the first embodiment described herein, wherein the fluorine based gases did not contact the silica soot particles prior to the silica soot particles being deposited upon bait rod 13.

Figure 5:
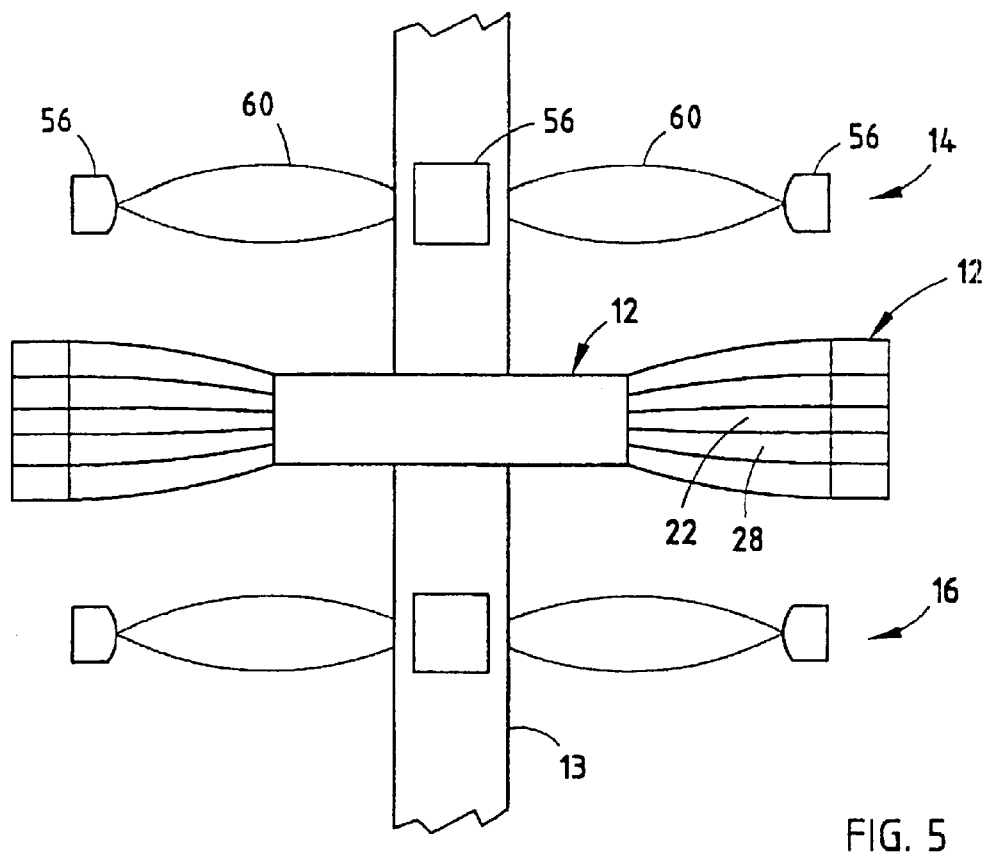
FIG. 5 is a schematic view of the burner/gas-feed system having a plurality of burners and gas-feeds.

Preferably, burner/gas-feed systems 10 (and 10A in FIG. 5) include a plurality of burners 12 and gas-feeds 14 and 16 equidistantly and concentrically spaced about the subject bait rod 13. As illustrated, burner/gas-feed system 10 includes four burners 12 and four gas-feeds 14 and 16, however, it should be noted that any number of burners 12 and gas-feeds 14 and 16 may be employed.

Figure 6:
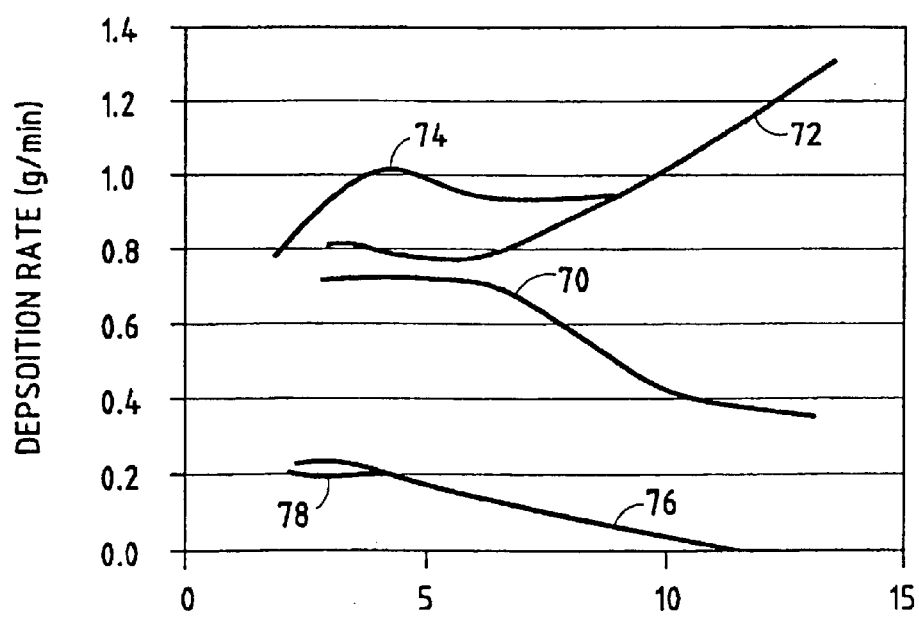
FIG. 6 is a graph of total fluorine incorporated per minute versus fluorine to silica ratio for the focused and linear outside doping methods.

A comparison between different fluorine depositing methods is graphed in FIG. 6. FIG. 6 shows a significantly higher total fluorine incorporation rate for both the outside doping linear manifold orientation of FIG. 1, as well as the outside doping focused manifold orientation of FIG. 4 as compared to corresponding doping methods that supply fluorine via a fume line, and/or within the inner shield of an associated burner. Specifically, line 70 indicates deposition rates which were achieved utilizing the focused manifold configuration to supply $SF_6$, line 72 indicates deposition rates which were achieved utilizing the linear manifold configuration to supply $SF_6$, line 74 indicates deposition rates which were achieved utilizing the linear manifold configuration to supply $CF_4$, line 76 indicates deposition rates which were achieved when supplying a mixture of $SF_6$ and $CF_4$ gases inside the inner shield of the burner, and line 78 indicates deposition rates which were achieved when supplying $CF_4$ via a fume line. In comparison, the methods utilizing both the linear manifold, as well as the focused manifold, to supply the fluorine-based gases result in a significantly higher deposition rate of fluorine as compared to those processes which supply the fluorine-based gases via a fume line and/or within the inner shield of the burner.

The present inventive improved method for doping silica with fluorine during laydown facilitates an increased rate of fluorine deposited within the silica soot during the fiber forming process by providing the associated fluorine-based gases to the silica soot outside the fume line and/or outside the inner shield of the associated burner system. The present inventive burner/gas-feed system makes it possible to increase fluorine deposition rates while simultaneously decreasing fluorine waste and fluorine associated pollution.

It will become apparent to those skilled in the art that various modifications to the preferred embodiment of the invention as described herein can be made without departing from the spirit or scope of the invention as defined in the appended claims.

The invention claimed is:

1. A method for doping silica Soot with fluorine during laydown, comprising the steps of:

providing a bait rod;

providing a burner, the burner emitting a reactant flame;

providing at least one first gas-feed separated from the burner, the gas-feed being an fluid communication with a source for supplying a first jet of fluorine based gases from the source;

depositing on a radial surface of the bait rod a layer of silica soot on the bait rod by vaporizing a silica producing gas emitted from the burner within the reactant flame of the burner; and supplying the first jet of fluorine-based gases to the silica soot deposited onto the bait rod via the first gas-feed subsequent to vaporizing at least a portion of the silica producing gas within the reactant flame of the burner.

2. The method of claim 1, wherein the first jet of fluorine supplying step includes directing the first jet of fluorine-based gases such that the first jet of fluorine-based gases does not contact the silica soot prior to the silica soot being deposited Onto the bait rod.

3. The method of claim 2, wherein the first jet of fluorine is directed substantially orthogonal to the bait rod.

4. The method of claim 3, and further including:

providing at least one second gas feed juxtaposed across the burner from the first gas-feed, the second gas-feed supplying a second jet of fluorine-based gases; and supplying the second jet of fluorine-based gases to the silica soot deposited onto the bait rod via the second gas-feed subsequent to vaporizing at least a portion of the silica producing gas within the reactant flame of the burner.

5. The method of claim 4, wherein the second jet of fluorine supplying step includes directing the second jet of fluorine-bases gases such that The second jet of fluorine-based gases does not contact the silica soot prior to the silica soot being deposited onto the bait rod.

6. The method of claim 5, wherein the fluorine-based gases include $SF_6$.

7. The method of claim 1, wherein the fluorine supplying step includes directing the first jet of fluorine-based gases such that the first jet of fluorine-based gases contacts the silica soot prior to the silica soot contacting the bait rod.

8. The method of claim 7, and further including:

providing at least one second gas-feed juxtaposed across the burner from the first gas-feed, the second gas-feed supplying a jet of fluorine-based gases; and supplying the second jet of fluorine-based gases to the silica soot deposited onto the bait rod via the gas-feed subsequent to vaporizing at least a portion of the silica producing gas within the reactant flame of the burner.

9. The method of claim 8, wherein the second jet of fluorine supplying step includes directing the second jet of fluorine-based gases such that the second jet of fluorine-based gases contacts the silica soot prior to the silica soot contacting the bait rod.

10. The method of claim 9, wherein the fluorine-based gases include $SF_6$.

11. The method of claim 1, and further including:

providing at least one second gas feed juxtaposed across the burner front the first gas-feed, the second gas-feed supplying a second jet of fluorine-based gases; and supplying the second jet of fluorine-based gases to the silica soot deposited onto the bait rod via the second gas-feed subsequent to vaporizing at least a portion of the silica producing gas within the reactant flame of the burner.

12. The method of claim 1, wherein the fluorine-based gases include $SF_6$.

13. The method of claim 1, wherein the reactant flame is produced from a compound containing hydrogen.

* * * * *